(12) United States Patent
Lee et al.

(10) Patent No.: US 10,102,656 B2
(45) Date of Patent: Oct. 16, 2018

(54) METHOD, SYSTEM AND RECORDING MEDIUM FOR PROVIDING AUGMENTED REALITY SERVICE AND FILE DISTRIBUTION SYSTEM

(71) Applicant: NAVER Corporation, Seongnam-si, Gyeonggi-do (KR)

(72) Inventors: Yoon Shick Lee, Seongnam-si (KR); Min sik Park, Seongnam-si (KR); Minoh Kim, Seongnam-si (KR)

(73) Assignee: Naver Corporation, Gyeonggi-do (KR)

( * ) Notice: Subject to any disclaimer, the term of this patent is extended or adjusted under 35 U.S.C. 154(b) by 65 days.

(21) Appl. No.: 15/352,738

(22) Filed: Nov. 16, 2016

(65) Prior Publication Data

US 2017/0069122 A1 Mar. 9, 2017

Related U.S. Application Data

(63) Continuation of application No. PCT/KR2015/004776, filed on May 13, 2015.

(30) Foreign Application Priority Data

May 16, 2014 (KR) .................. 10-2014-0058918

(51) Int. Cl.
| | |
|---|---|
| *G06T 11/60* | (2006.01) |
| *H04N 5/262* | (2006.01) |
| *G06F 3/0346* | (2013.01) |
| *G06F 3/0354* | (2013.01) |
| *G06F 17/30* | (2006.01) |

(Continued)

(52) U.S. Cl.
CPC .............. *G06T 11/60* (2013.01); *G06F 3/011* (2013.01); *G06F 3/017* (2013.01); *G06F 3/0346* (2013.01); *G06F 3/03547* (2013.01); *G06F 3/0481* (2013.01); *G06F 3/04815* (2013.01); *G06F 17/30194* (2013.01); *G06F 17/30265* (2013.01); *G06T 1/0007* (2013.01); *G06T 3/4038* (2013.01); *G06T 19/006* (2013.01);

(Continued)

(58) Field of Classification Search
CPC .......................... G06T 19/006; G06F 3/04815
USPC .................. 345/649–688; 382/103, 209–223
See application file for complete search history.

(56) References Cited

U.S. PATENT DOCUMENTS

| | | | | |
|---|---|---|---|---|
| 8,594,980 B2 * | 11/2013 | McKiel | .................... | G06N 5/02 345/621 |
| 8,749,580 B1 * | 6/2014 | Lininger | .............. | G11B 27/322 345/473 |

(Continued)

FOREIGN PATENT DOCUMENTS

| | | |
|---|---|---|
| JP | 2011-215946 A | 10/2011 |
| KR | 10-2007-0019813 A | 2/2007 |

(Continued)

*Primary Examiner* — Ryan R Yang
(74) *Attorney, Agent, or Firm* — Harness, Dickey & Pierce, P.L.C.

(57) ABSTRACT

An augmented reality providing method may include providing space information corresponding to an image acquired from a mobile device as augmented reality, based on the image; calculating a view shift location for shifting a view in the augmented reality under control of the mobile device; extracting an image corresponding to the view shift location from a database that stores an image including location information; and providing the extracted image under control of the mobile device.

20 Claims, 11 Drawing Sheets

(51) Int. Cl.
*G06T 1/00* (2006.01)
*G06T 3/40* (2006.01)
*G06T 19/00* (2011.01)
*G06F 3/01* (2006.01)
*G06F 3/0481* (2013.01)

(52) U.S. Cl.
CPC ... *H04N 5/262* (2013.01); *G06F 2203/04802* (2013.01); *G06F 2203/04806* (2013.01)

(56) References Cited

U.S. PATENT DOCUMENTS

| | | | | |
|---|---|---|---|---|
| 2011/0052015 A1* | 3/2011 | Saund | ............... | G06T 7/33 382/124 |
| 2011/0244957 A1* | 10/2011 | Nishimura | .......... | A63F 13/5258 463/31 |
| 2012/0216149 A1* | 8/2012 | Kang | ................. | G06F 3/04815 715/848 |
| 2012/0218263 A1* | 8/2012 | Meier | ..................... | G06T 19/00 345/419 |
| 2012/0249586 A1* | 10/2012 | Wither | ............... | H04N 1/00323 345/633 |
| 2013/0120450 A1* | 5/2013 | Kim | ......................... | G09G 5/22 345/633 |
| 2013/0201215 A1* | 8/2013 | Martellaro | ............... | G09G 5/00 345/633 |
| 2013/0321461 A1* | 12/2013 | Filip | ....................... | G06F 3/011 345/632 |
| 2014/0129949 A1* | 5/2014 | Singer | .................... | H04L 67/18 715/733 |
| 2015/0213577 A1* | 7/2015 | Filip | ................. | H04N 5/23238 345/671 |
| 2016/0167512 A1* | 6/2016 | Joo | ........................ | B60K 35/00 345/167 |
| 2016/0275367 A1* | 9/2016 | Eliazar | ................ | G06K 9/6211 |

FOREIGN PATENT DOCUMENTS

KR 10-2011-0012523 A 2/2011
KR 10-2012-0095247 A 8/2012
KR 10-2013-0053535 A 5/2013

* cited by examiner

METHOD, SYSTEM AND RECORDING MEDIUM FOR PROVIDING AUGMENTED REALITY SERVICE AND FILE DISTRIBUTION SYSTEM

CROSS-REFERENCE TO RELATED APPLICATION(S)

This is a continuation of International Application No. PCT/KR2015/004776, filed May 13, 2015, which claims priority under 35 U.S.C. § 119 to Korean Patent Application No. 10-2014-0058918 filed on May 16, 2014, in the Korean Intellectual Property Office (KIPO), the entire contents of each of which are hereby incorporated herein by reference.

BACKGROUND

Field

One or more example embodiments relate to an augmented reality providing method and/or system for providing an augmented reality function.

Description of Related Art

Augmented reality is a sub-field of virtual reality and is related to a computer graphics scheme of synthesizing a virtual object with an actual environment (or, alternatively, the real world) such that, from the point of view of a user, the virtual object appears to be present in the actual environment. The augmented reality supplements the actual environment by overlappingly a virtual image having the virtual object within an image of the actual environment to generate an image in which the virtual object and the actual environment are mixed. Accordingly, further plentiful information may be realistically provided by supplementing and thereby providing additional information that may not be readily acquired in the real world alone. In this aspect, the augmented reality technology is applicable to a variety of real-world environments, and particularly, is gaining attention as next-generation display technology suitable for a ubiquitous environment.

By providing information to a user through fusing augmented reality with location-based service (LBS) technology and wireless Internet service technology, it is possible to increase the user convenience of using a wireless communication device and the like.

An augmented reality service in related systems may collect real image data of a front of a vehicle and provide route information on a real map using augmented reality. The augmented reality service according to the related art may additionally display road network or facility information, etc., on an image viewed through a camera. However, many augmented reality services are based on an image that is viewed through a current camera, and thus may not readily use space information occluded by another facility or invisible space information separate away from a current location of a user.

SUMMARY

One or more example embodiments provide an augmented reality providing method and/or system that may provide an augmented reality function without restrictions on a distance or a space.

One or more example embodiments also provide an augmented reality providing method and/or system that may provide an improved (or, alternatively, an optimal) image while shifting a view of augmented reality based on sensor information collected at a mobile device.

In some example embodiment, the method of providing an augmented reality function includes generating space information corresponding to a captured image acquired from a mobile device; calculating a view shift location associated with shifting a view of the captured image; extracting a stored image corresponding to the view shift location from a database that stores a plurality of images having location information associated therewith; and transmitting the extracted image to the mobile device.

In some example embodiments, the calculating of the view shift location includes calculating one or more of a travel distance of plane coordinates, an azimuth, an altitude level and a ground level based on a control command signal received from the mobile device, the control command signal being generated in response to a movement of the mobile device or a user input signal.

In some example embodiments, the stored image includes a panoramic image.

In some example embodiments, the stored image is stored in the database such that the stored image is associated with the location information, and the location information includes one or more of a location value, an azimuth value of plane coordinates, and an altitude level associated with the stored image.

In some example embodiments, the extracting includes extracting an exterior panoramic image to the mobile device, the exterior panoramic image being an image of a structure associated with a location corresponding to the view shift location.

In some example embodiments, the extracting includes extracting an interior panoramic image of a structure present at a location corresponding to the view shift location in response to a user of the mobile device zooming into an interior of the structure.

In some example embodiments, the extracting includes extracting an air panoramic image of a structure present at a location corresponding to the view shift location in response to the mobile device requesting a birds eye view of the location of the structure.

In some example embodiments, the extracting includes extracting an underground panoramic image of a structure present at a location corresponding to the view shift image in response to the mobile device requesting an underground view of the location of the structure.

Some example embodiments relate to a non-transitory computer-readable recording medium storing instructions that, when executed by a processor, configure the processor to, generate space information corresponding to a captured image acquired from a mobile device; calculating a view shift location associated with shifting a view of the captured image; extracting a stored image corresponding to the view shift location from a database that stores a plurality of images having location information associated therewith; and transmitting the extracted image to the mobile device.

Some example embodiments relate to an augmented reality providing system.

In some example embodiments, the augmented reality providing system includes a provider configured to provide space information corresponding to an image acquired from a mobile device as augmented reality, based on the image; a calculator configured to calculate a view shift location for shifting a view in the augmented reality under control of the mobile device; and an extractor configured to extract an image corresponding to the view shift location from a database that stores an image including location information, wherein the provider is further configured to provide the extracted image under control of the mobile device.

Some example embodiments relate to a file distribution system.

In some example embodiments, the file distribution system is configured to distribute an application to a mobile device, the file distribution system including a transmitter configured to transmit the application in response to a request from the mobile device, wherein the file distribution system is configured to instruct the mobile device to install the application; and a processor configured to, transmit, via the transmitter, space information corresponding to a captured image acquired from the mobile device, receive a control command signal from the mobile device in response to a movement of the mobile device or a user input signal, extract a stored image corresponding to the view shift location from a database that stores a plurality of images having location information associated therewith, and transmit the stored image in response to the control command signal such that the mobile device is configured to switch from the captured image to the stored image upon receipt of same.

In some example embodiments, the control command signal includes at least one of location information by a measurement sensor, orientation information by a geomagnetic sensor, travel speed and travel location information by an acceleration sensor, function information of a specific motion by a motion recognition sensor, and function information of a specific touch by a touch sensor.

In some example embodiments, the control command signal includes at least one of a command signal indicating a travel distance of plane coordinates of the mobile device, an azimuth of the mobile device, an altitude level and a ground level with respect to a view of the captured image.

In some example embodiments, the processor is configured to instruct the mobile device to switch from the captured image of the augmented reality to an exterior panoramic image of a structure associated with a location corresponding to the view shift location.

In some example embodiments, the processor is configured to instruct the mobile device to switch from the captured image of the augmented reality to an interior panoramic image of a structure associated with at a location corresponding to the view shift image in response to a user of the mobile device zooming into an interior of the structure.

In some example embodiments, the processor is configured to instruct the mobile device to switch from the captured image of the augmented reality to an air panoramic image of a structure associated with a location corresponding to the view shift image in response to the mobile device requesting a birds eye view of the location of the structure.

In some example embodiments, the processor is configured to instruct the mobile device to switch from the captured image of the augmented reality to the an underground panoramic image of a structure associated with a location corresponding to the view shift image in response to the mobile device requesting an underground view of the location of the structure.

In some example embodiments, the processor is configured to instruct the mobile device to display a scene switching graphics effect when switching between the captured image of the augmented reality and the stored image.

In some example embodiments, the scene switching graphics effect is based on one or more of a heading direction and a travel speed of the mobile device.

Some example embodiments relate to a mobile device.

In some example embodiments, the mobile device includes a input/output (I/O) device configured to exchange data with an augmented reality server; and a processor configured to, transmit a captured image to the augmented reality server, generate a control command signal based on information collected from one or more sensors associated with the mobile device, transmit the control command signal to the augmented reality server, receive a stored image from the augmented reality server, the stored image corresponding to a view shift location associated with shifting a view of the captured image, and switch from displaying the captured image to the stored image.

In some example embodiments, the mobile device further includes a camera configured to capture the captured image.

According to some example embodiments, it is possible to provide an image most suitable for a corresponding view while shifting a view under intuitive control of a user terminal in an augmented reality environment based on a camera image by using a pre-captured image, particularly, an image including location information. Thus, it is possible to readily employ an augmented reality function without restrictions on a distance or a space at a current location of a user.

According to some example embodiments, it is possible to provide a further wide and expanded augmented reality service, such as a street view showing an exterior image of a structure, an air view showing an air image corresponding to a specific location, an underground view showing an image of underground facility present at a specific location, an interior view showing an interior image of a structure, etc., by using a pre-captured image and by applying a travel distance of plane coordinates, an azimuth, and an altitude as a view shift location for shifting an augmented reality view under intuitive control of a user terminal.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
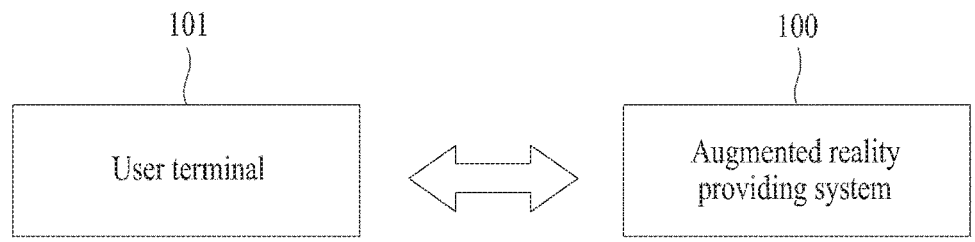
FIG. 1 is a diagram illustrating an example of a relationship between a user terminal and an augmented reality providing system according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given example embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to augmented reality service technology in which location-based service (LBS) technology and wireless Internet service technology are fused, and more particularly, to an augmented reality providing method and system that may provide space information around a user through augmented reality.

FIG. 1 is a diagram illustrating an example of a relationship between a user terminal and an augmented reality providing system according to at least one example embodiment.

Referring to FIG. 1, s an augmented reality providing system 100 may be connected to a user terminal 101. An indicator with arrowheads may indicate that data may be transmitted and received between the augmented reality providing system 100 and the user terminal 101 over a wired or wireless network.

The user terminal 101 refers to a mobile device, for example, a smartphone, a tablet, a wearable computer, a virtual reality headset, and the like, and may indicate any type of terminal devices capable of installing and executing a service exclusive application (hereinafter, an augmented reality app) associated with the augmented reality providing system 100. Here, the user terminal 101 may perform the overall service operation, such as a service screen configuration, a data input, a data transmission and reception, a data storage, and the like, under control of the augmented reality app.

The augmented reality providing system 100 serves as a service platform that provides an augmented reality service to the user terminal 101 corresponding to a client. In particular, the augmented reality providing system 100 may provide a platform service of providing space information corresponding to a target location to be displayed on a screen of the user terminal 101 in response to the target location indicated at the user terminal 101.

For example, a camera of the user terminal 101 may be powered on in response to execution of the augmented reality app, and an image (hereinafter, a camera image) captured through the camera may be transmitted to the augmented reality providing system 100 together with location information of the user terminal 101.

The augmented reality providing system 100 may initially set a region of interest (ROI) based on the location information of the user terminal 101, and may verify a target object, for example, a road, a facility, etc., included in the camera image through matching between the ROI and the camera image, and may transmit space information associated with the target object to the user terminal 101. Accordingly, once space information is received from the augmented reality providing system 100 in association with the target object included in the camera image, the user terminal 101 may add and thereby display the received information on the camera image.

As described above, space information may be represented based on a current image captured through the camera of the user terminal 101. Space information associated with an object occluded by another object or an object present at a relatively far distance may not be represented on the current image.

To remedy the above issue, according to at least one example embodiment, an augmented reality function may be configured beyond limits of distance or space using a database system that stores and maintains a captured (or, alternatively, a pre-captured image), particularly, an image including location information. For example, an image having a location value corresponding to a view while shifting a view under intuitive control of the user terminal 101 may be provided.

Hereinafter, a control environment of the user terminal 101 will be described.

The user terminal 101 may display an augmented reality screen on which space information is added on the camera image in interaction with the augmented reality providing system 100, through the augmented reality app. Here, the user terminal 101 may transmit information collected from a variety of sensors to the augmented reality providing system 100 over a wired or wireless network as a control command signal for the augmented reality screen.

For example, during an execution of the augmented reality app, the user terminal 101 may transmit, to the augmented reality providing system 100, indoor/outdoor location information by a measurement sensor, for example, a global positioning system (GPS) module, a wireless fidelity (WiFi) module, etc., orientation information by a geomagnetic sensor, travel speed and travel location information by an acceleration sensor, function information of a specific motion by a motion recognition sensor, function information of a specific touch by a touch sensor, and the like.

Figure 2:
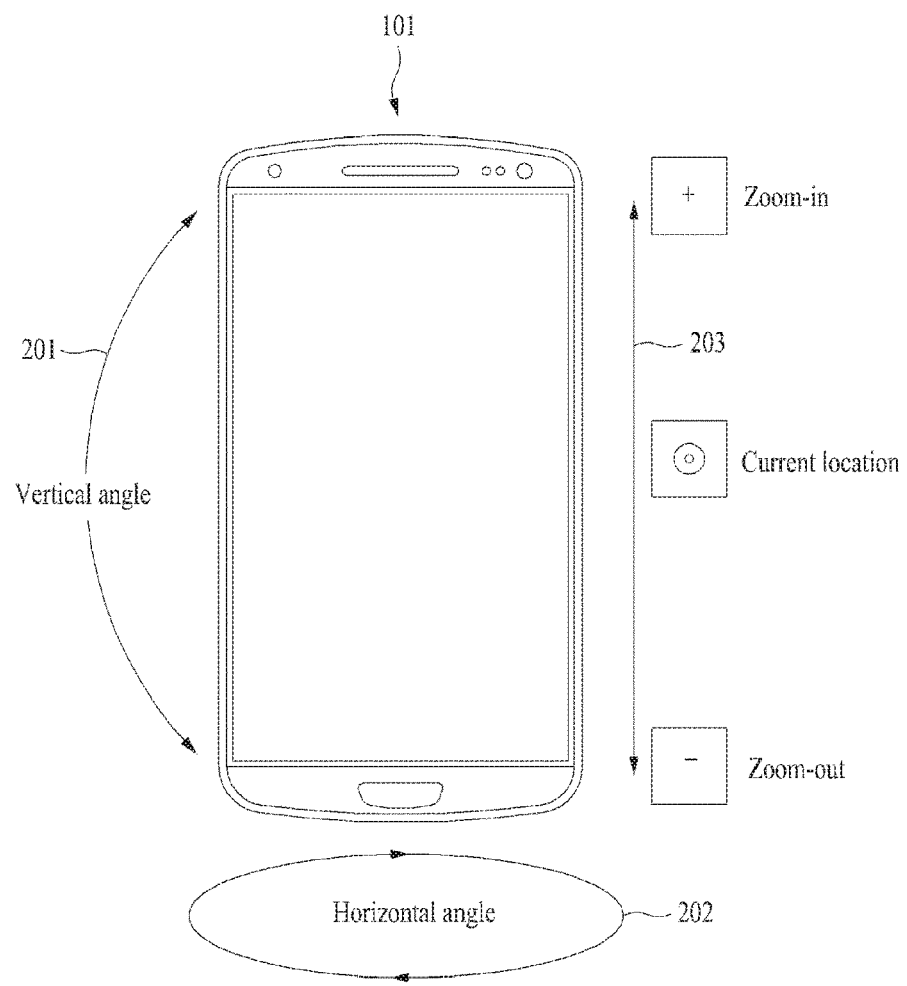
FIG. 2 illustrates an example of a control environment of a user terminal according to at least one example embodiment.

FIG. 2 illustrates an example of a control environment of a user terminal according to at least one example embodiment;

Referring to FIG. 2, the user terminal 101 may generate and transfer a vertical angle 201, a horizontal angle 202, and/or a focal distance (zoom) 203, and the like, acquirable through sensors provided to the user terminal 101, as a control command signal for the augmented reality screen.

Accordingly, the augmented reality providing system 100 may interpret a view shift location from the control command signal received from the user terminal 101, and may provide image data corresponding to the view shift location as a response to the control command signal. For example, if a view is shifted under intuitive control, for example, zoom-in/zoom-out, of the user terminal 101 while the augmented reality providing system 100 is providing space information based on an image, that is, a camera image captured through the camera of the user terminal 101, the augmented reality providing system 100 may calculate a view shift location and may provide an image most suitable for the view shift location.

Hereinafter, an operation of the augmented reality providing system 100 will be described.

Figure 3:
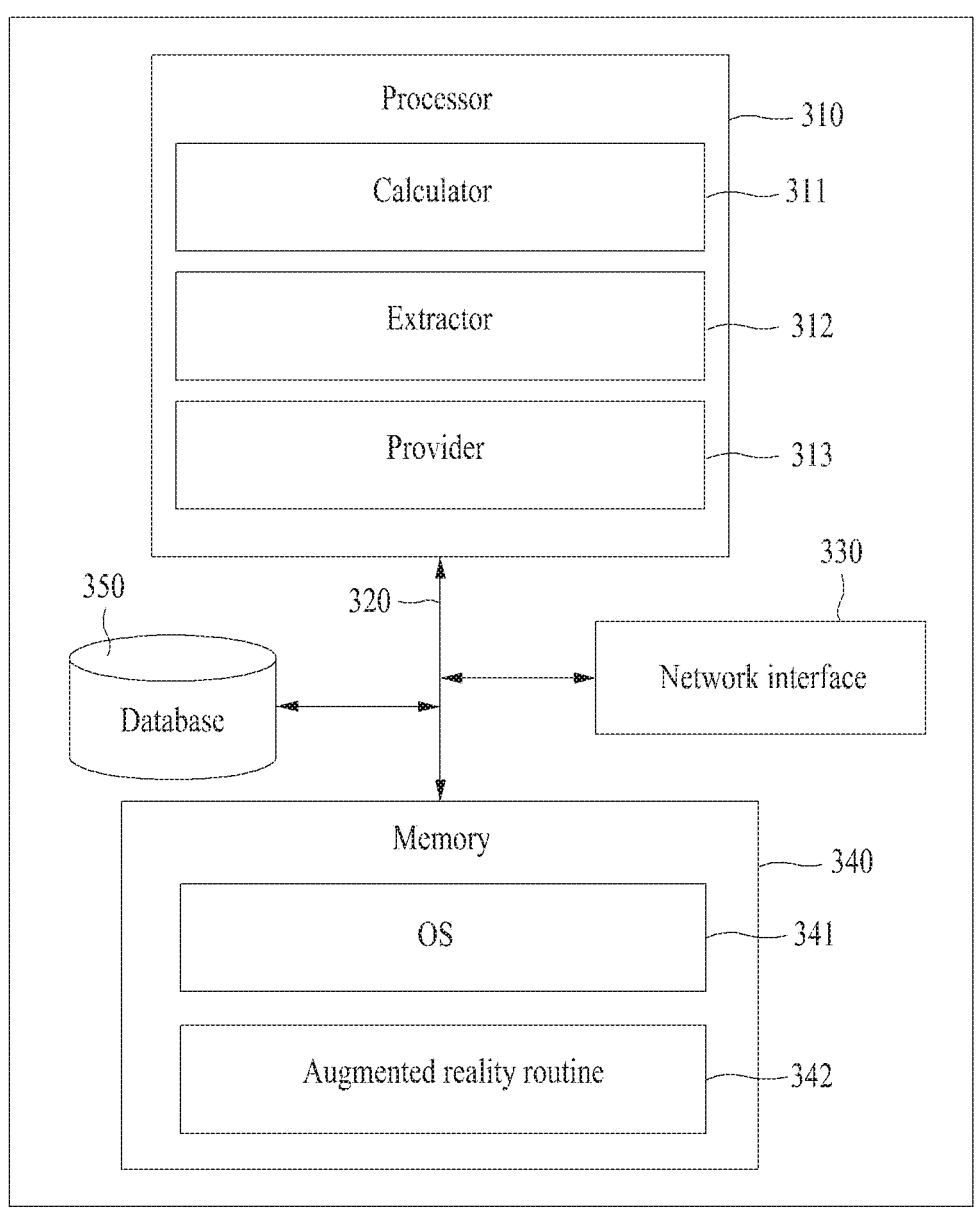
FIG. 3 is a block diagram illustrating a configuration of an augmented reality providing system according to at least one example embodiment.
Figure 4:
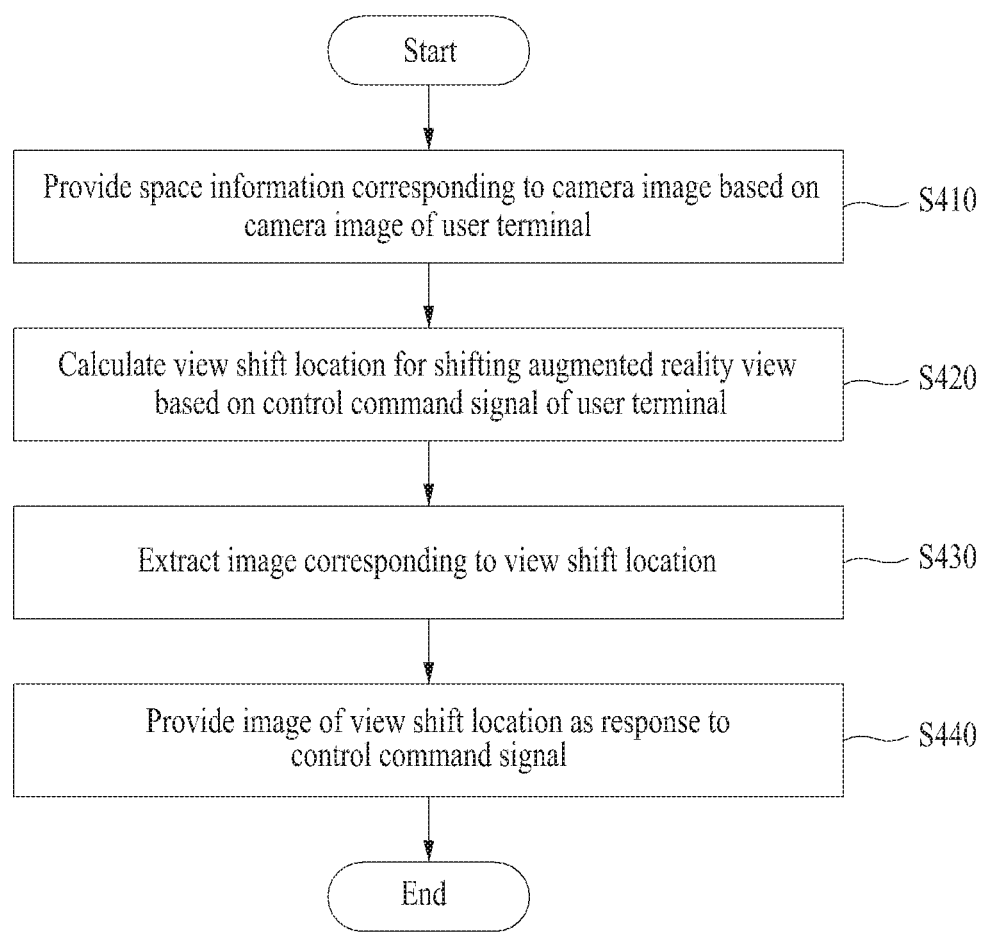
FIG. 4 is a flowchart illustrating an augmented reality providing method according to at least one example embodiment.

FIG. 3 is a block diagram illustrating an example of a configuration of an augmented reality providing system according to at least one example embodiment, and FIG. 4 is a flowchart illustrating an augmented reality providing method according to at least one example embodiment.

Referring to FIG. 3, an augmented reality providing system 300 may include a processor 310, a bus 320, a network interface 330, a memory 340, and a database 350. The memory 340 may include an operating system (OS) 341 and an augmented reality routine 342. The augmented reality providing system 300 may be a block diagram presentation of the augmented reality providing system 100 of FIG. 1.

The processor 310 may execute program code that configures the processor 310 to perform the functions of a calculator 311, an extractor 312, and a provider 313. According to other example embodiments, the augmented reality providing system 300 may include a greater or lesser number of constituent elements than the number of constituent elements shown in FIG. 3.

The memory 340 may include a permanent mass storage device, such as random access memory (RAM), read only memory (ROM), a disk drive, etc., as a computer-readable storage medium. Also, program codes (e.g., computer-readable instructions) for the OS 341 and the augmented reality routine 342 may be stored in the memory 340. Such software constituent elements may be loaded from another computer-readable storage medium separate from the memory 340 using a drive mechanism (not shown). The other computer-readable storage medium may include, for example, a floppy drive, a disk, a tape, a DVD/CD-ROM drive, a memory card, etc. Software constituent elements may be loaded to the memory 340 through the network interface 330 instead of, or in addition to, the computer-readable storage medium.

The bus 320 enables communication and data transmission between the constituent elements of the augmented reality providing system 300. The bus 320 may be configured using a high-speed serial bus, a parallel bus, a storage area network (SAN), and/or another appropriate communication technology.

The network interface 330 may be a computer hardware element for connecting the augmented reality providing system 300 to the computer network. The network interface 330 may connect the augmented reality providing system 300 to the computer network through a wireless and/or wired connection.

The database 350 may serve to store and maintain captured (or, alternatively, pre-captured) images, and may include, for example, a general photo having location information, a 360-degree panoramic image, etc. Here, location information may include a plane coordinate value, an azimuth value, and an altitude level or a ground level as a location value associated with an image. Although FIG. 3 illustrates that the database 350 is included in the augmented reality providing system 300, the database 350 may be present as an external database constructed on a separate system.

The processor 310 may be configured to process computer-readable instructions of a computer program by performing a basic arithmetic operation, a logic operation, and an input/output operation of the augmented reality providing system 300. The computer-readable instructions may be provided from the memory 340 and/or the network interface 330 to the processor 310 through the bus 320. The processor 310 may be configured to execute program codes for the calculator 311, the extractor 312, and the provider 313. The program codes may be stored in a storage device, such as the memory 340.

When the processor 310 executes the program code, the processor 310 may perform the functions of the calculator 311, the extractor 312, and the provider 313, such that the processor 310 is configured to perform operations S410 through S440 of FIG. 4.

Referring to FIGS. 3 and 4, in operation S410, the provider 313 may provide an augmented reality associated with a camera image acquired from a user terminal by providing space information corresponding to the camera image to the user terminal based on the camera image. For example, the provider 313 may set an ROI based on a current location of the user terminal, may verify a target object, for example, a road, a facility, etc., included in the camera image by matching the ROI and the camera image, and may provide space information associated with the target object.

Figure 5:
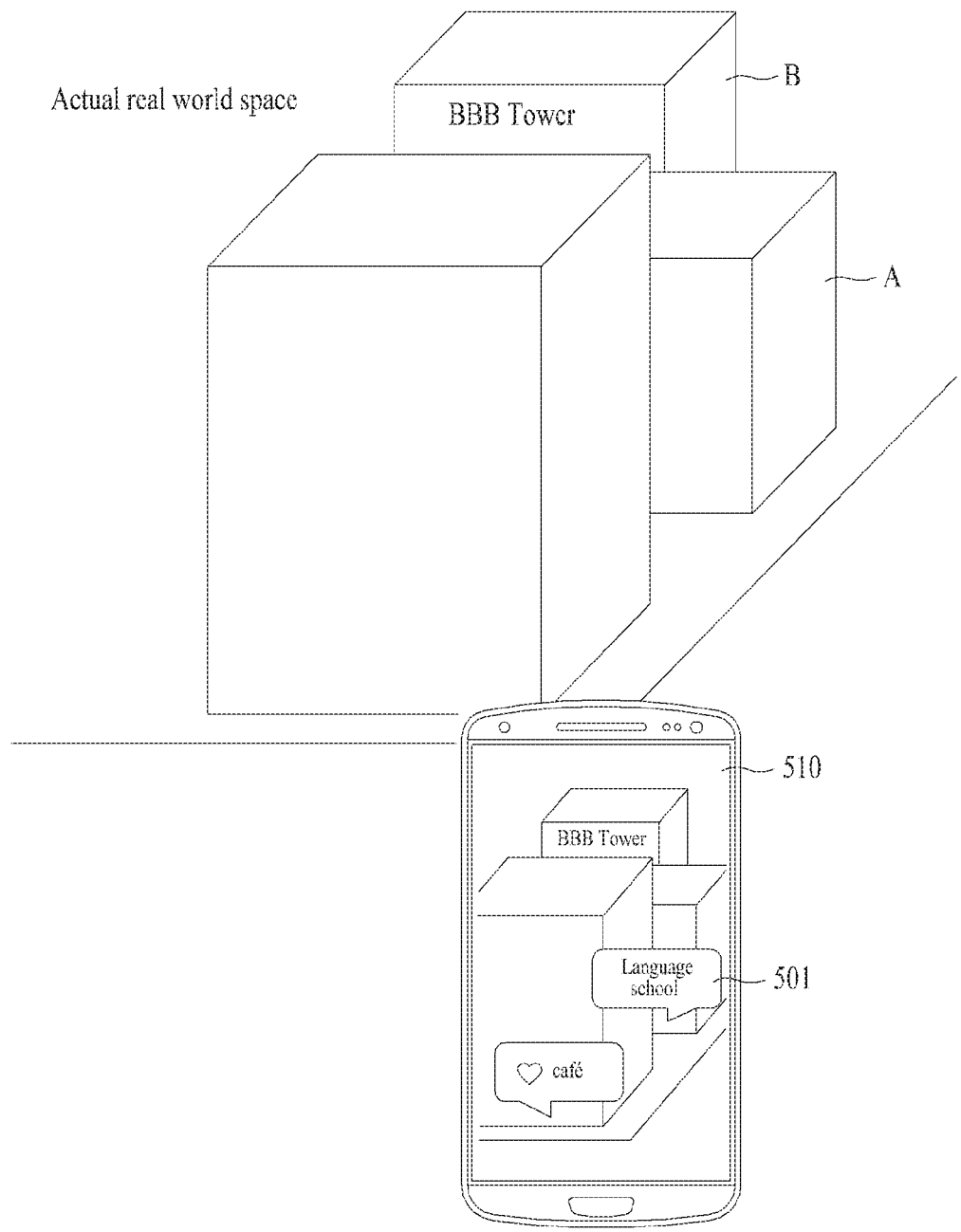
FIG. 5 illustrates an example of configuring an augmented reality function according to at least one example embodiment.

FIG. 5 illustrates an example of configuring an augmented reality function according to at least one example embodiment;

Referring to FIG. 5, when performing the operations of the provider 313, the processor 310 may provide an augmented reality service that represents facility information 501 on a camera image 510 about an actual reality space captured at the user terminal.

Referring back to FIGS. 3 and 4, in operation S420, when performing the operations of the calculator 311, the processor 310 may calculate a view shift speed and/or a view shift location for shifting an augmented reality view based on a control command signal of the user terminal. For example, the calculator 311 may calculate a view shift location by interpreting, for example, indoor/outdoor location information by a measurement sensor, orientation information by a geomagnetic sensor, travel speed and travel location information by an acceleration sensor, function information of a specific motion by a motion recognition sensor, function information of a specific touch by a touch sensor, and the like. Here, the sensors may be associated with the user terminal. The view shift location may include a travel distance of plane coordinates, an azimuth, and an altitude level or a ground level.

For example, referring to FIG. 2, the calculator 311 may calculate a travel distance corresponding to the focal distance 203 of a zoom-in value or a zoom-out value based on a current location of the user terminal, may calculate an azimuth corresponding to the horizontal angle 202 at which the user terminal has horizontally rotated, and may calculate the altitude level or the ground level corresponding to the vertical angle 201 at which the user terminal has vertically rotated. Meanwhile, the vertical angle 201 of the user terminal may be used to calculate the travel distance and the focal distance 203 may be used to calculate the altitude level or the ground level. Further, the altitude level or the ground level may be calculated from a specific motion recognition, for example, a motion of raising or dropping a hand with holding the user terminal in the user's hand, a motion of jumping or sitting with holding the user terminal in the user's hand, etc. Essential elements to calculate the view shift location may be readily changed based on information acquirable through sensors of the user terminal.

In operation S430, when performing the operations of the extractor 312, the processor 310 may extract an image corresponding to the view shift location from the database 350. That is, the extractor 312 may extract image data matching the calculated view shift location within a set (or, alternatively, a preset) range from among images stored in the database 350. The images in the database 350 may be constructed in advance, however, example embodiments are not limited thereto.

In operation S440, while providing the augmented reality based on the camera image, the provider 313 may provide the extracted image data as a response to the control command signal of the user terminal.

Referring back to FIG. 5, if a user desires to find building B behind building A, the user may not use information about the building B because the building B is occluded by the building A on the camera image 510. Here, to acquire information about the building B, the user may request a shift of an augmented reality view by zooming in or out, by vertically or horizontally rotating the user terminal, or by taking a specific motion with holding the user terminal with respect to the camera image 510 to which the augmented reality is applied.

Figure 6:
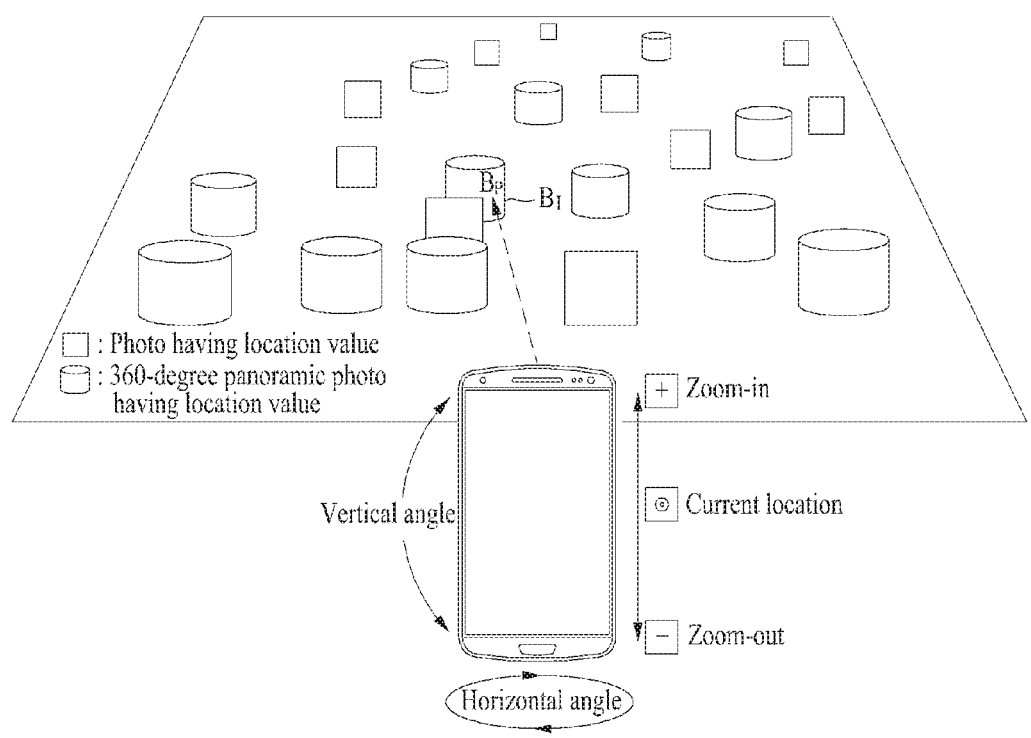
FIG. 6 illustrates an example of location distribution of images having location values according to at least one example embodiment.

FIG. 6 illustrates an example of location distribution of images of which location information is present within a ROI based on a current location of the user terminal among images stored in the database 350 according to at least one example embodiment.

Referring to FIG. 6, the calculator 311 may calculate a view shift location based on a control command signal of the user terminal. Here, if the calculated view shift location corresponds to a point $B_P$, the extractor 312 may extract image data $B_1$ having location information closest to the point $B_P$ from the database 350.

FIGS. 7 through 11 illustrate examples of a screen that provides a pre-captured image present at a shifted view in an augmented reality environment according to at least some example embodiments.

Figure 7:
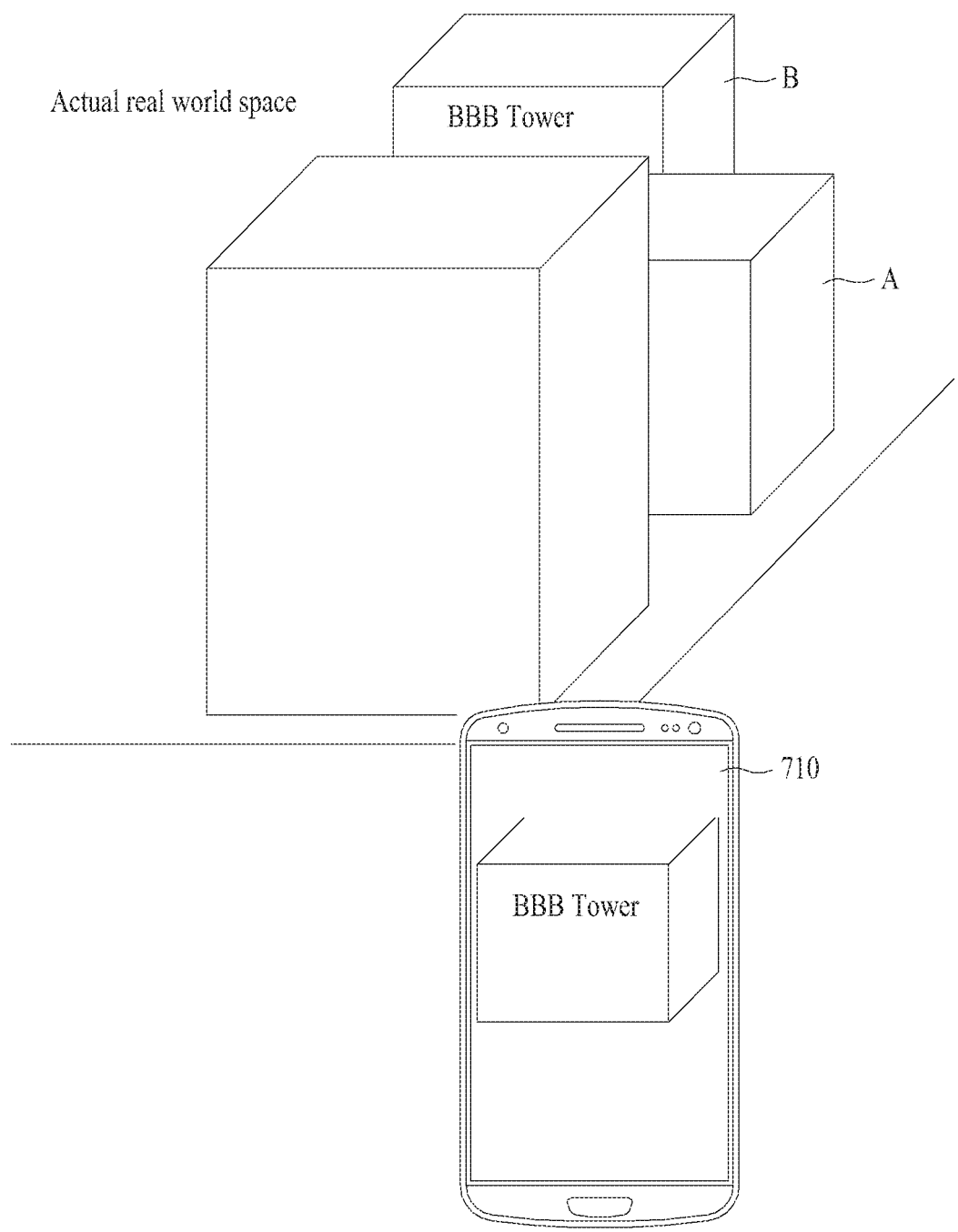
FIGS. 7 through 11 illustrate examples of a screen that provides a pre-captured image present at a shifted view in an augmented reality environment according to at least some example embodiments.

Referring to FIG. 7, when location information corresponding to the point $B_P$ is building B that the user is to find, the provider 313 may provide a pre-captured panoramic photo 710 of the building B to be displayed on the screen of the user terminal.

The user terminal may display the image data provided from the provider 313 of the augmented reality providing system 300 on the screen according to a user control.

Figure 8:
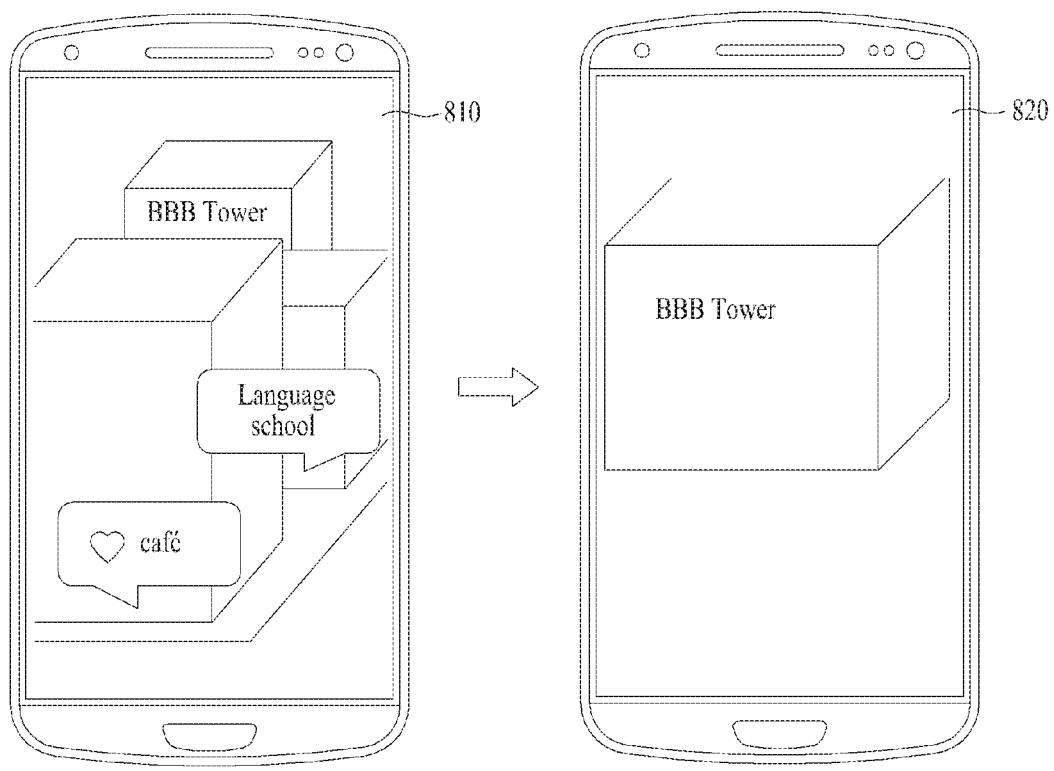

For example, referring to FIG. 8, the user terminal may switch from a camera image 810 to which augmented reality is applied to an exterior panoramic photo 820 of a specific building according to a user control.

Figure 9:
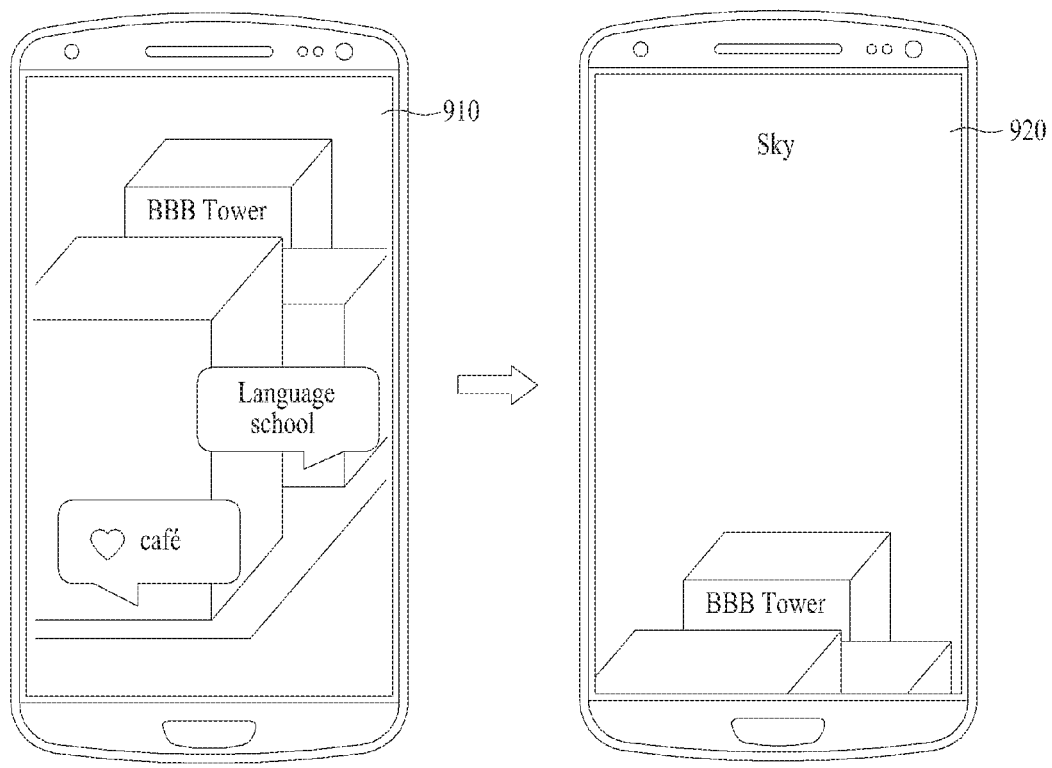

As another example, referring to FIG. 9, the user terminal may switch from a camera image 910 to which augmented reality is applied to an air panoramic photo 920 corresponding to a specific location according to a user control. The air panoramic photo 920 may be a photo appearing from the perspective of the sky looking down at the specific location.

Figure 10:
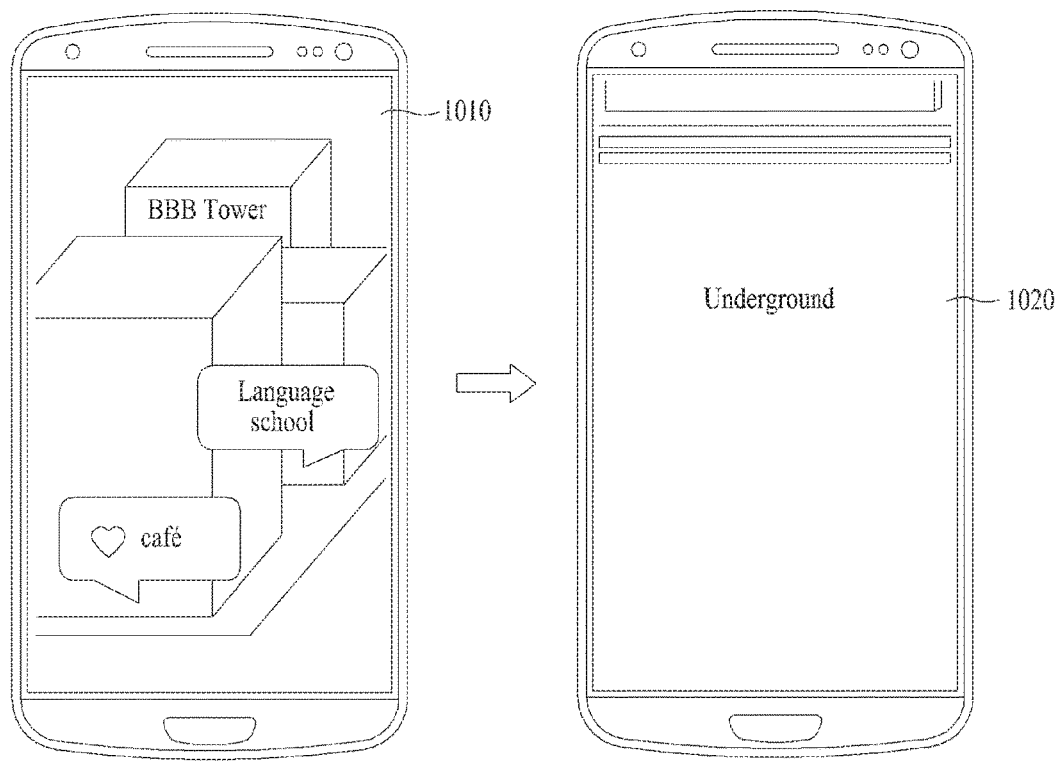

As another example, referring to FIG. 10, the user terminal may switch from a camera image 1010 to which augmented reality is applied to a panoramic photo 1020 of underground facility, for example, an underground store, an underground station, etc., present at a specific location according to a user control.

Figure 11:
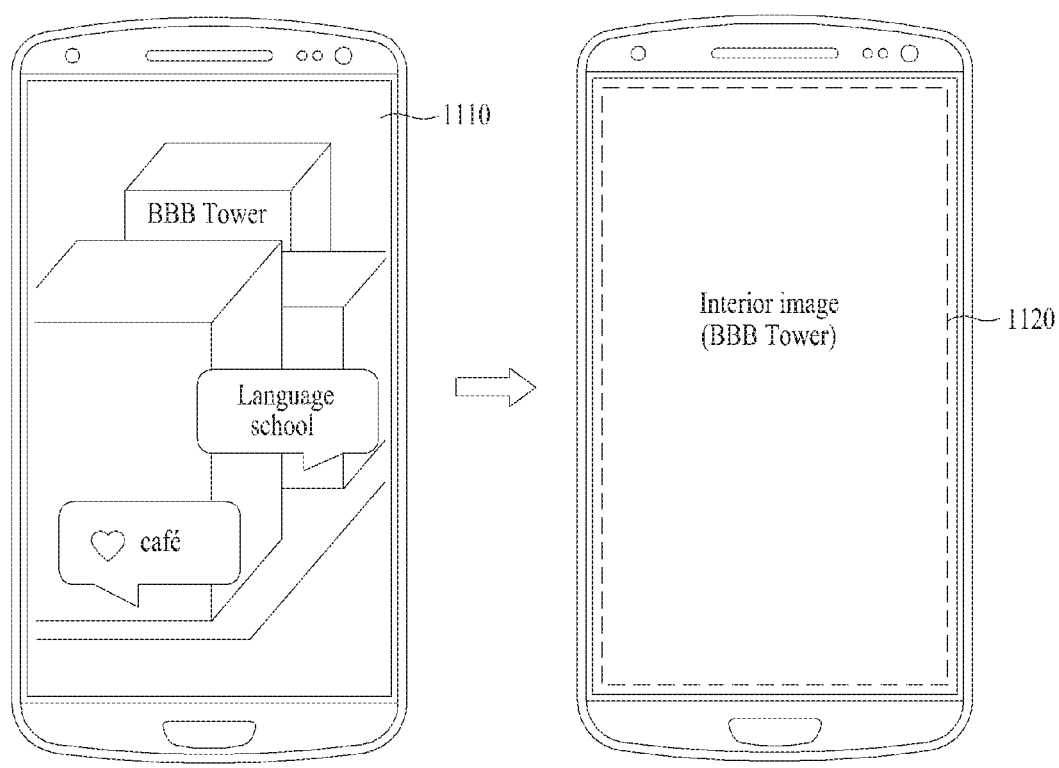

As another example, referring to FIG. 11, the user terminal may switch from a camera image 1110 to which augmented reality is applied to an interior panoramic photo 1120 of a specific building according to a user control.

As described above, the provider 313 may automatically switch from an augmented reality environment based on a camera image to one service among a street view showing an exterior panoramic photo of a specific building, an air view showing an air panoramic photo corresponding to a specific location, an underground view showing a panoramic photo of underground facility present at a specific location, and an interior view showing an interior panoramic photo of a specific building, based on a travel distance, an azimuth, and an altitude level or a ground level, according to a control of the user terminal. For example, the provider 313 may provide an exterior panoramic image of a building present at another location while shifting a view location when controlling a zoom, and may provide an up/down image of the same location, such as displaying an air panoramic image when the user moves (or, alternatively, tilts) the terminal 101 upward and an underground panoramic image when the user moves (or, alternatively, tilts) the terminal 101 downward. If an interior image of a building present at a specific location is captured in advance, the provider 313 may also provide an augmented reality function as if seeing through from an exterior image to an interior image, for example, when the user zooms in on the specific location via the terminal 101.

Here, the provider 313 may generate (or, alternatively, instruct the terminal 101 to generate) a scene switching animation in response to a view shift direction when switching from a camera image to which augmented reality is applied to a pre-captured photo. Here, the scene switching animation may include a view shift effect that a view gradually comes closer to a point corresponding to a view shift location, a graphics effect as if the user sees through from outdoors to indoors, and the like, in the camera image. Here, a scene switching speed may correspond to a view shift speed calculated based on a control command signal of the user terminal.

According to the example embodiments, if the user controls the user terminal 101 while looking around through a camera or glass of the user terminal or with naked eyes, it is possible to calculate orientation information, a travel speed, and a travel location according to a user control, and to display the most suitable image data.

Figure 12:
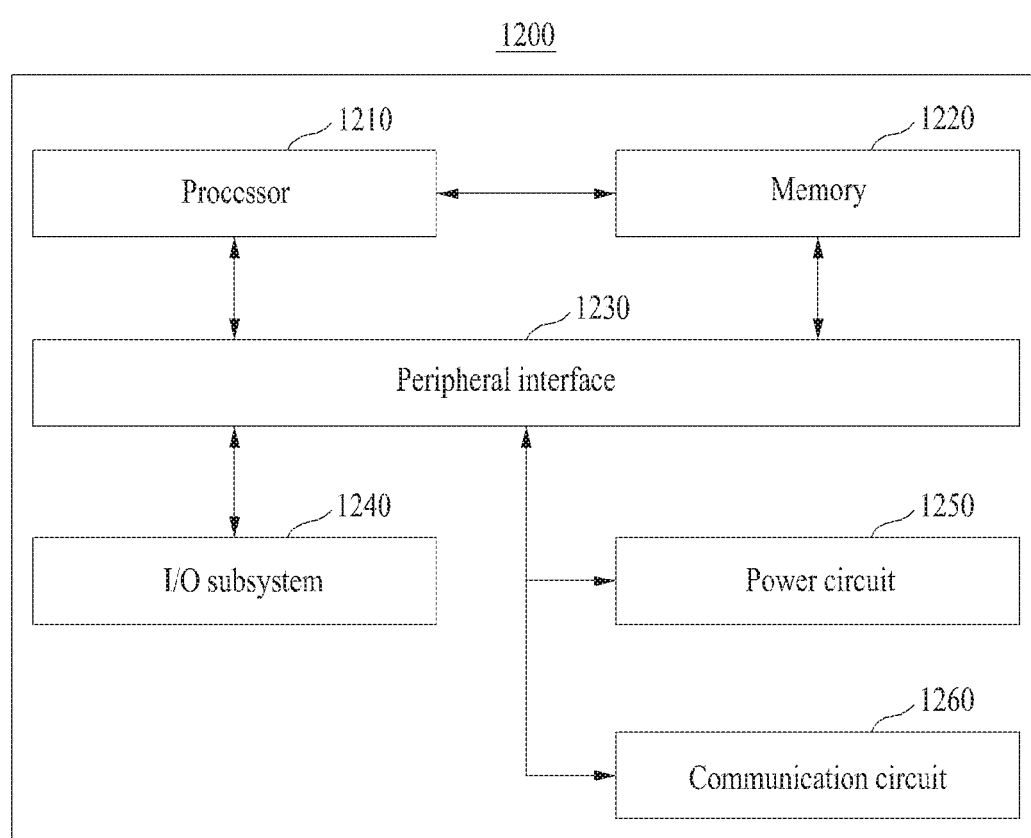
FIG. 12 is a block diagram illustrating an example of a configuration of a computer system according to at least one example embodiment.

FIG. 12 is a block diagram illustrating a configuration of a computer system according to at least one example embodiments.

Referring to FIG. 12, a computer system 1200 may include at least one processor 1210, a memory 1220, a peripheral interface 1230, an input/output (I/O) subsystem 1240, a power circuit 1250, and a communication circuit 1260. The computer system 1200 may correspond to the user terminal 101.

The memory 1220 may include, for example, a high-speed random access memory (HSRAM), a magnetic disk, a static random access memory (SRAM), a dynamic RAM (DRAM), read only memory (ROM), a flash memory, and a non-volatile memory. The memory 1220 may include a software module, an instruction set, or a variety of data required for an operation of the computer system 1200. Here, an access from another component, such as the processor 1210 and the peripheral interface 1230, to the memory 1220 may be controlled by the processor 1210.

The peripheral interface 1230 may couple an input device and/or an output device of the computer system 1200 with the processor 1210 and the memory 1220.

The processor 1210 may perform a variety of functions for the computer system 1200 and process data by executing the software module or the instruction set stored in the memory 1220.

The processor 1210 may be configured to execute instructions associated with installing and executing an augmented reality application. The processor 1210, when executing the augmented reality application, may use a camera associated with the user terminal 101 to capture a camera image and one or more sensors to collect information associated with the user terminal, and transmit the camera image to the augmented reality providing system 100 together with a control command signal based on the information from the user terminal 101. Thereafter, the processor 120, may receive space information and/or a an extracted image from the augmented reality providing system 100, where the space information is associated with a target object included in the camera image, and generate an augmented reality screen by adding the received space information and the camera image or, alternatively, switching from the camera image to the extracted image received from the augmented reality providing system 100.

The I/O subsystem 1240 may couple various I/O peripheral devices with the peripheral interface 1230. For example, the I/O subsystem 1240 may include a controller for coupling the peripheral interface 1230 and a peripheral device, such as a monitor, a keyboard, a mouse, a printer, and a touch screen or a sensor depending on a necessity. The I/O peripheral devices may be coupled with the peripheral interface 1230 without using the I/O subsystem 1240.

The power circuit 1250 may supply a power to all of or a portion of components of a terminal. For example, the power circuit 1250 may include a power management system, at least one power source such as a battery and alternating circuit (AC), a charge system, a power failure detection circuit, a power converter or inverter, a power status indicator, or other components for creating, managing and distributing power.

The communication circuit 1260 enables communication with another computer system using at least one external port. Alternatively, as described above, the communication circuit 1260 may enable communication with another computer system by including a radio frequency (RF) circuit and thereby transmitting and receiving an RF signal known as an electromagnetic signal.

The example embodiment of FIG. 12 is only an example of the computer system 1200. The computer system 1200 may have a configuration or an arrangement for omitting a portion of the components illustrated in FIG. 12, further including components not illustrated in FIG. 12, or coupling two or more components. For example, a computer system for a communication terminal of a mobile environment may further include a touch screen, a sensor, and the like, in addition to the components of FIG. 12. A circuit for RF communication using a variety of communication methods, for example, wireless fidelity (Wi-Fi), 3rd generation (3G), long term evolution (LTE), Bluetooth, near field communication (NFC), and ZigBee, may be included in the communication circuit 1260. Components includable in the computer system 1200 may be configured as hardware that includes an integrated circuit specified for at least one signal processing or application, software, or a combination of hardware and software.

The methods according to some example embodiments may be configured in a program instruction form executable through a variety of computer systems, and may be recorded in non-transitory computer-readable media.

In particular, a program according to the example embodiments may be configured as a PC-based program or an application exclusive for a mobile terminal. The augmented reality app may be configured as an independently operating program or an in-app form of a specific application to be operable on the specific application.

Also, the methods according to the example embodiments may be performed in such a manner that an application associated with a server system providing an augmented reality service to a user terminal controls the user terminal. For example, the application may include a module configured to control the mobile device to receive, from a server, space information corresponding to an image acquired from a mobile device, based on the image, and to provide the space information as augmented reality; a module configured to control the mobile device to transmit, to the server, a control command signal that is generated in response to a movement of the mobile device or a user input signal; a module configured to control the mobile device to receive a pre-captured image from the server in response to the control command signal; and a module configured to control the mobile device to switch from the image of the augmented reality to the received image.

Also, the application may be installed on the user terminal through a file provided from a file distribution system. For example, the file distribution system may include a file transmitter (not shown) configure to transmit the file in response to a request of the user terminal.

As described above, according to some example embodiments, it is possible to provide an image most suitable for a corresponding view while shifting a view under intuitive control of a user terminal in an augmented reality environment based on a camera image by using a pre-captured image, particularly, an image including location information. Thus, it is possible to readily employ an augmented reality function without restrictions on a distance or a space at a current location of a user. According to some example embodiments, it is possible to provide a further wide and expanded augmented reality service, such as a street view showing an exterior image of a specific building, an air view showing an air image corresponding to a specific location, an underground view showing an image of underground facility present at a specific location, an interior view showing an interior image of a specific building, etc., by using a pre-captured image and by applying a travel distance of plane coordinates, an azimuth, and an altitude as a view shift location for shifting an augmented reality view under intuitive control of a user terminal.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular example embodiment, but, where applicable, are interchangeable and can be used in a selected example embodiment, even if not specifically shown or described. The same may also be varied in many ways. Such variations are not to be regarded as a departure from the example embodiments, and all such modifications are intended to be included within the scope of the example embodiments.

What is claimed is:

1. A method of providing an augmented reality function, the method comprising:

generating space information corresponding to a captured image acquired from a mobile device;

receiving an indication that a user of the mobile device wishes to shift a view from a current view of the captured image to a new view occulated by an object, the new view being from a different perspective than the current view;

calculating a view shift location associated with shifting the view of the captured image to the new view occulated by the object;

extracting a stored image of an non-occulated version of the new view corresponding to the view shift location from a database, the database storing a plurality of images having location information associated therewith; and transmitting the extracted image to the mobile device.

2. The method of claim 1, wherein the calculating of the view shift location comprises:

calculating one or more of a travel distance of plane coordinates, an azimuth, an altitude level or a ground level based on a control command signal received from the mobile device, the control command signal being generated in response to a movement of the mobile device or a user input signal indicating that the user wishes to shift the view to the new view occulated by the object.

3. The method of claim 1, wherein the stored image includes a panoramic image.

4. The method of claim 1, wherein the stored image is stored in the database such that the stored image is associated with the location information, and the location information includes one or more of a location value, an azimuth value of plane coordinates, and an altitude level associated with the stored image.

5. The method of claim 1, wherein the extracting comprises:

extracting an exterior panoramic image and transmitting the exterior panoramic image to the mobile device, the exterior panoramic image being an image of a structure associated with a location corresponding to the view shift location.

6. The method of claim 1, wherein the extracting comprises:

extracting an interior panoramic image of a structure present at a location corresponding to the view shift location in response to the user of the mobile device zooming into an interior of the structure.

7. The method of claim 1, wherein the extracting comprises:

extracting a birds-eye panoramic image of a structure present at a location corresponding to the view shift location in response to the mobile device requesting a birds eye view of the location of the structure.

8. The method of claim 1, wherein the extracting comprises:

extracting an underground panoramic image of a structure present at a location corresponding to the view shift image in response to the mobile device requesting an underground view of the location of the structure.

9. A non-transitory computer-readable recording medium storing instructions that, when executed by a processor, configures the processor to, generate space information corresponding to a captured image acquired from a mobile device;

receiving an indication that a user of the mobile device wishes to shift a view from a current view of the captured image to a new view occulated by an object, the new view being from a different perspective than the current view;

calculate a view shift location associated with shifting the view of the captured image to the new view occulated by the object;

extract a stored image corresponding to the view shift location from a database that stores a plurality of images having location information associated therewith; and transmit the extracted image to the mobile device.

10. A file distribution system configured to distribute an application to a mobile device, the file distribution system comprising:

a transmitter configured to transmit the application in response to a request from the mobile device, wherein the file distribution system is configured to instruct the mobile device to install the application; and a processor configured to, transmit, via the transmitter, space information corresponding to a captured image acquired from the mobile device, the captured image being associated with an augmented reality, receive a control command signal from the mobile device in response to a movement of the mobile device or a user input signal such that the control command signal indicates at least that a user of the mobile device wishes to shift a view from a current view of the captured image to a new view occulated by an object, the new view being from a different perspective than the current view, extract, from a database that stores a plurality of images having location information associated therewith, a stored image of an non-occulated version of the new view corresponding to a view shift location associated with shifting the view of the captured image to the new view occulated by the object, and transmit the stored image in response to the control command signal such that the mobile device is configured to switch from the captured image to the stored image upon receipt of same such that the mobile device displays the non-occulated version of the new view to the user while the user remains physically present at a location associated with the current view.

11. The file distribution system of claim 10, wherein the control command signal includes at least one of location information by a measurement sensor, orientation information by a geomagnetic sensor, travel speed and travel location information by an acceleration sensor, function information of a specific motion by a motion recognition sensor, and function information of a specific touch by a touch sensor.

12. The file distribution system of claim 10, wherein the control command signal includes at least one of a command signal indicating a travel distance of plane coordinates of the mobile device, an azimuth of the mobile device, an altitude level and a ground level with respect to the current view of the captured image.

13. The file distribution system of claim 10, wherein the processor is configured to instruct the mobile device to switch from the captured image of the augmented reality to an exterior panoramic image of a structure associated with a location corresponding to the view shift location.

14. The file distribution system of claim 10, wherein the processor is configured to instruct the mobile device to switch from the captured image of the augmented reality to an interior panoramic image of a structure associated with at a location corresponding to the stored image in response to the user of the mobile device zooming into an interior of the structure.

15. The file distribution system of claim 10, wherein the processor is configured to instruct the mobile device to switch from the captured image of the augmented reality to a birds-eye panoramic image of a structure associated with a location corresponding to the stored image in response to the mobile device requesting a birds eye view of the location of the structure.

16. The file distribution system of claim 10, wherein the processor is configured to instruct the mobile device to switch from the captured image of the augmented reality to an underground panoramic image of a structure associated with a location corresponding to the stored image in response to the mobile device requesting an underground view of the location of the structure.

17. The file distribution system of claim 10, wherein the processor is configured to instruct the mobile device to display a scene switching graphics effect when switching between the captured image of the augmented reality and the stored image.

18. The file distribution system of claim 17, wherein the scene switching graphics effect is based on one or more of a heading direction and a travel speed of the mobile device.

19. A mobile device comprising:
   an input/output (I/O) device configured to exchange data with an augmented reality server; and
   a processor configured to,
      transmit a captured image to the augmented reality server,
      generate a control command signal based on information collected from one or more sensors associated with the mobile device such that the control command signal indicates at least that a user of the mobile device wishes to shift a view from a current view of the captured image to a new view occulated by an object, the new view being from a different perspective than the current view,
      transmit the control command signal to the augmented reality server,
      receive a stored image of an non-occulated version of the new view from the augmented reality server, the stored image corresponding to a view shift location associated with shifting the view of the captured image to the new view occulated by the object, and
      switch from displaying the captured image to the stored image such that the mobile device displays the non-occulated version of the new view to the user while the user remains physically present at a location associated with the current view.

20. The mobile device of claim 19, further comprising: a camera configured to capture the captured image.

* * * * *